(12) United States Patent
Janssen et al.

(10) Patent No.: US 11,068,257 B2
(45) Date of Patent: Jul. 20, 2021

(54) METHOD FOR PROCESSING A SOFTWARE PROJECT

(71) Applicant: Beckhoff Automation GmbH, Verl (DE)

(72) Inventors: Dirk Janssen, Verl (DE); Ramon Barth, Verl (DE); Thomas Robert Ziegler, Schloß Holte-Stukenbrock (DE); Michael Josef Schlottbom, Raesfeld (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 16/892,143

(22) Filed: Jun. 3, 2020

(65) Prior Publication Data

US 2020/0293308 A1    Sep. 17, 2020

Related U.S. Application Data

(63) Continuation of application No. PCT/EP2019/062779, filed on May 17, 2019.

(30) Foreign Application Priority Data

May 17, 2018   (DE) ..................... 10 2018 111 930.5

(51) Int. Cl.
*G06F 8/658*    (2018.01)
*G06F 8/61*    (2018.01)
(Continued)

(52) U.S. Cl.
CPC ............... *G06F 8/658* (2018.02); *G06F 8/61* (2013.01); *G06F 8/66* (2013.01); *G06F 8/71* (2013.01)

(58) Field of Classification Search
CPC ... G06F 8/61; G06F 8/658; G06F 8/66; G06F 8/71

See application file for complete search history.

(56) References Cited

U.S. PATENT DOCUMENTS 8,924,935 B1    12/2014   Chopra et al.
9,575,764 B1 *   2/2017   Turner ..................... G06F 8/71
(Continued)

FOREIGN PATENT DOCUMENTS

DE    102018111930 A1    11/2019
EP    2503449 A2    9/2012
(Continued)

OTHER PUBLICATIONS

"Automatically copy pushed files from one GitHub repository to another" Stackoverflow.com, Apr. 18, 2018.
(Continued)

*Primary Examiner* — Marina Lee
(74) *Attorney, Agent, or Firm* — Dorsey & Whitney LLP (57) ABSTRACT

A method is provided for processing a software project comprising a primary code and a machine code on a first processing station by a user. The method comprises downloading a first copy of the primary code from a first memory to the first processing station, modifying the first copy of the primary code, and generating a first program version of the machine code, where the first program version of the machine code is generated from the first copy of the primary code, uploading the first program version of the machine code to a second memory, and automatically uploading the modified copy of the primary code into the first memory, triggered by the upload of the first program version of the machine code into the second memory.

20 Claims, 11 Drawing Sheets

(51) Int. Cl.
*G06F 8/65* (2018.01)
*G06F 8/71* (2018.01)

(56) References Cited

U.S. PATENT DOCUMENTS

| | | | | |
|---|---|---|---|---|
| 2003/0061311 A1* | 3/2003 | Lo | ............. | G06F 8/20 709/220 |
| 2014/0359602 A1* | 12/2014 | Sawaya | ............. | G06F 8/61 717/176 |
| 2017/0277742 A1* | 9/2017 | Arkhipova | ............. | G06F 16/275 |
| 2018/0060066 A1 | 3/2018 | Rihani et al. | | |
| 2020/0272454 A1* | 8/2020 | Cikoski | ............. | G06F 8/48 |

FOREIGN PATENT DOCUMENTS

| | | |
|---|---|---|
| EP | 2811352 A1 | 12/2014 |
| EP | 3173884 A1 | 5/2017 |
| WO | 2019219899 A1 | 11/2019 |

OTHER PUBLICATIONS

"Comparison of Version-Control Software" Wikipedia entry, retrieved on Feb. 5, 2019, https://en.wikipedia.org/w/index.php?title=Comparison_of_version-control_software&oldid=840204728.

"Engineering Framework TIA Portal V15 with Focus on Applications, Digitization and Efficiency" e-paper, Nov. 26, 2017, Industrial Magazine.

"Git" Wikipedia entry, retrieved on Feb. 5, 2019, https://en.wikipedia.org/w/index/php?title=Git&oldid=840401990.

"LASAL Engineering Tool" specification, May 2014, SIGMATEK GmbH & Co KG.

"FactoryTalk AssetCenter Software Simplifies Life-Cycle Management, Automates Asset Discovery" press release, Jun. 9, 2019, Rockwell Automation.

"Omron Releases Sysmac Studio Team Edition with a Fully Integrated, Decentralized Open Source Version Control System (GIT)" press release, Oct. 19, 2017, Omron Europe BV, The Netherlands.

"System Architecture: Factory Talk Asset Center" webinar, Jan. 1, 2015, Rockwell Automation, Inc.

Ludtke, "How I Continuously Deploy My Static Website" danrl.com, Nov. 1, 2017.

Markova, "Deploy code to Containers for Git Automatically" Jelastic.com, Apr. 20, 2017.

Putano, "Software Trends for 2018: Continuous Delivery" stackify.com, Feb. 5, 2018.

"eXPERT related and Supported Tools" power point presentation, Jul. 1, 2003, Sofia, Bulgaria.

Weigel, "Automated Version Control Facilitates Team Software Development" internet article, Mar. 19, 2014, Elektro Technik Automatisierung.

* cited by examiner

METHOD FOR PROCESSING A SOFTWARE PROJECT

CROSS REFERENCE TO RELATED APPLICATIONS

The application is a continuation of International Application PCT/EP2019/062779, filed May 17, 2019, entitled METHOD FOR PROCESSING A SOFTWARE PROJECT, which claims priority to German Patent Application DE 10 2018 111 930.5, filed May 17, 2018, entitled VERFAHREN ZUM BEARBEITEN EINES SOFTWAREPROJEKTS, each of which is incorporated by reference herein, in the entirety and for all purposes.

FIELD

The invention relates to a method for processing a software project on a first processing station, a processing station and an automation system having such a processing station.

BACKGROUND

Software projects such as controllers for automation systems are becoming increasingly complex. In many cases, the control software for an automation system is so complex that both the creation and modification of the software project is carried out by a number of users. The same applies to software projects in other areas, such as computer games and office programs. Thus, procedures have to be found to allow for several users working on a software project simultaneously without overwriting existing statuses of the project. This may e.g. be carried out by providing a programming environment on a processing station, wherein the software project consists of objects that may be downloaded to the processing station while a time stamp is assigned. If two editors process the same object at the same time and then upload it back into the memory, this may be detected by the time stamps. Instead of the upload carried out later in time, a user is then requested to examine the modified objects and, if necessary, make further changes before uploading again. Such a procedure is described in EP 2 811 352 A1.

In addition, software for distributed version management of files is known. In this context, either a central server may be used for storing the versions of the software project or, as implemented for example with Git (https://de.wikipedia.org/wiki/Git), by distributing the versions of the software project in a decentralized manner.

SUMMARY

The invention provides an improved method for processing a software project. The invention further provides a processing station on which the process may be carried out and an automation system in which such a processing station is integrated.

According to a first aspect, a method for processing a software project consists of a primary code and a machine code by a first user, the following method steps are carried out in the specified order, the processing being carried out on a first processing station. At first, a first copy of the primary code is downloaded to the first processing station from a first memory. The primary code thereby includes all files that may be directly processed by the first user. The first copy of the primary code is then modified by the first user. For this purpose, the first user may use the resources provided by the first processing station. Subsequently, a first program version of the machine code is generated from the first modified copy of the primary code. The machine code includes all files used by a computer when executing the software project. The machine code is thus the executable version of the software project while the primary code is a programmable form of the software project. After generating the first program version of the machine code, the first program version of the machine code is uploaded into a second memory. The second memory may be assigned to a computer on which the software project is to be executed. The upload of the first program version of the machine code may be triggered by an input of the first user, if the first user is of the opinion that he has a corresponding executable program version of the machine code available. Triggered by the upload of the first program version of the machine code into the second memory, the modified copy of the primary code is automatically uploaded into the first memory.

According to a second aspect, a processing station has a data interface and an input facility for a user. The processing station is set up to perform the above-mentioned method.

According to a third aspect, an automation system comprises a first memory, an automation component having a second memory and at least one such processing station.

EXAMPLES

In a method for processing a software project consisting of a primary code and a machine code by a first user, the following method steps are carried out in the specified order, the processing being carried out on a first processing station. At first, a first copy of the primary code is downloaded to the first processing station from a first memory. The primary code thereby includes all files that may be directly processed by the first user. The first copy of the primary code is then modified by the first user. For this purpose, the first user may use the resources provided by the first processing station. Subsequently, a first program version of the machine code is generated from the first modified copy of the primary code. The machine code includes all files used by a computer when executing the software project. The machine code is thus the executable version of the software project while the primary code is a programmable form of the software project. After generating the first program version of the machine code, the first program version of the machine code is uploaded into a second memory. The second memory may be assigned to a computer on which the software project is to be executed. The upload of the first program version of the machine code may be triggered by an input of the first user, if the first user is of the opinion that he has a corresponding executable program version of the machine code available. Triggered by the upload of the first program version of the machine code into the second memory, the modified copy of the primary code is automatically uploaded into the first memory.

The first user therefore does not have to remember to upload his modified copy of the primary code which may e.g. be the modified first copy of the primary code into the first memory after machining. In this way, the files of the primary code belonging to the executable machine code stored in the second memory may be made available to other users in the first memory. Another user could now download the modified primary code to their processing station and carry out further changes. Even if this user now uploads another executable version of the machine code to the second memory, the modified primary code is automatically stored in the first memory. This greatly simplifies version management during programming or while the software project is being revised since the users, for example the programmers, only have to worry about uploading the executable program versions of the machine code into the second memory. The files of the primary code modified by the users are automatically uploaded into the first memory.

In an embodiment example of the method, an additional check is carried out whether, between downloading the first copy of the primary code and uploading the first program version of the machine code into the second memory, a second program version of the machine code generated from a second copy of the primary code has been uploaded into the second memory. This would e.g. be the case if at the same time as the first user, a second user had uploaded a program version of the machine code into the second memory starting from the same or an earlier primary code version. If it is determined during the check that a second program version of the machine code has been uploaded into the second memory, a modified second copy of the primary code is downloaded from the first memory to the first processing station and a request is issued to the first user to merge the first copy of the primary code and the second copy of the primary code into a third copy of the primary code. A third program version of the machine code may then be generated from the third copy of the primary code. The third program version of the machine code may then be uploaded to the second memory. The automatic upload of the modified copy of the primary code into the first memory is thereby configured as uploading the third copy of the primary code into the first memory. Checking whether a modified program version of the machine code has been uploaded may therefore be carried out before the modified copy of the primary code is automatically uploaded, since uploading the first copy of the primary code modified by the first user is not mandatory in this case.

Alternatively, however, it may be provided that when uploading the first program version of the machine code, both the modified first copy of the primary code is automatically uploaded and then, after the check, the third copy of the primary code is also automatically uploaded into the first memory, triggered by the upload of the third program version of the machine code.

In an embodiment of the method, the upload of the first program version of the machine code is aborted prior to issuing the request to the first user. This saves transmission bandwidth between the first processing station and the second memory. Alternatively or additionally, it may be provided that the modified first copy of the primary code is automatically uploaded into the first memory in each case and, if it is determined that a second program version of the machine code has been uploaded, the upload of the modified first copy of the primary code into the first memory may also be aborted.

In an embodiment of the method, a check is carried out, as well, whether a second program version of the machine code generated from a second copy of the primary code has been uploaded into the second memory between downloading the first copy of the primary code and uploading the first program version of the machine code into the second memory. Subsequently, a modified second copy of the primary code is downloaded and a request to the first user is issued to merge the first copy of the primary code and the second copy of the primary code to result in a third copy of the primary code. In this embodiment, however, the second version of the program is overwritten with the first version of the program, triggered by a reaction of the first user to the issued request. The automatic upload of the modified copy of the primary code into the first memory is in this context embodied as uploading the modified first copy of the primary code into the first memory. In this embodiment, for example, the first processing station may be configured to issue a warning to the first user. The purpose of this warning is to signal to the first user that uploading the first program version would lead to overwriting the status of the software project created by a second user. However, after checking the first copy and the second copy of the primary code, the first user may override this warning by a user input.

In an embodiment, the check is carried out using a time stamp of the program version of the machine code. This time stamp may, for example, be integrated into the machine code when generating the program version of the machine code and refer to the time of downloading the copy of the primary code.

In an embodiment, checking is carried out by a hash value of the program version of the machine code. A hash value of the program version in the second memory is generated during the download of the first copy of the primary code and then compared with a hash value of the program version of the machine code during upload of the first program version of the machine code to the second memory. If, in the meantime, another user has uploaded a second program version of the machine code to the second memory, the hash values no longer match and it may be determined that the second program version of the machine code has been uploaded to the second memory.

In an embodiment, the program versions of the machine code are generated by compiling copies of the primary code. This is a common method of generating machine code (machine readable code) from primary code.

In an embodiment, the software project includes a configuration file. The configuration file is a part of the primary code. Moreover, the configuration file is integrated into the program versions of the machine code. Modifying the first copy of the primary code comprises a modification of the configuration file. The modified configuration file is uploaded to the second memory, as well. Integrating the configuration file into the machine code may e.g. be carried out by requesting the configuration file by the machine code. This may e.g. be advantageous if the software project is configured in such a way that it is possible to change individual parameters, but this does not have a significant effect on the software architecture of the machine code. Such parameters may then be made available in the configuration file, wherein the configuration file may be modified as part of the primary code and the configuration file is read out by the machine code so that the parameter may be taken into account when the machine code is executed.

In an embodiment of the method, a plurality of primary code versions are stored in the first memory. At the first processing station, a display of the primary code versions stored in the first memory may be retrieved. This allows the first user to access previous states of the primary code during the processing of the software project. This allows for more flexible programming and may also be used as a first instance of a data backup.

In an embodiment of the method, one or a plurality of primary code versions from the first memory are synchronized with a third memory according to a standard. The standard may be a user input or an automatic specification. For example, the primary code versions may be automatically saved weekly in a third memory which serves as a data backup. At the same time, if the first user feels that he has reached a milestone during programming of the software project, a user input may trigger a synchronization of the primary code versions from the first memory with the third memory.

In an embodiment of the method, the software project is an automation project, wherein the machine code is used to control an automation component. The second memory is located in the automation component. This means that the second memory for the machine code for storing the program version of the machine code used to control the automation component is arranged in a memory in the automation component. This results in a simple system architecture. The first memory may be arranged outside of the automation component, e.g. on a central file server.

In an embodiment of the method, the first memory is located in the automation component. Then the automation component may be used to provide the primary code from a first memory and to upload the readable machine code into the second memory of the automation component. In this case, the first memory and the second memory may be designed as a physical storage medium within the automation component, for example a hard disk or a flash memory.

A processing station has a data interface and an input facility for a user. The processing station is set up to perform one of the above-mentioned methods. This particularly means that a computer program may be run on the processing station which interacts with the first user in such a way that the method steps carried out by the first processing station may be carried out. During execution of the method, the first user may make changes, for example to the primary code, wherein these changes are not carried out by the processing station. The modified primary code is then used to generate the machine code, and automated version management may be carried out by uploading the modified primary code into the first memory.

The processing station may comprise a display that shows information to the first user. Alternatively or additionally, the processing station may be designed as a server which allows access with another computer from outside the processing station. This access to the server then represents the input possibility for the first user.

An automation system comprises a first memory, an automation component having a second memory and at least one such processing station. The automation system may include readout options for sensors and provide control signals for actuators. The machine code is used to control the automation component, wherein control may take place on the basis of the read-out sensors and may lead to the output of signals to the actuators. A first communication link is established between the first memory and the processing station. A second communication link is established between the processing station and the second memory. This allows the primary code to be downloaded to the processing station from the first memory and, after modifying the primary code, to be uploaded from the processing station to the second memory. The machine code then stored in the second memory may then be executed by the automation component.

BRIEF DESCRIPTION OF THE DRAWINGS

The invention will be discussed in more detail below by means of embodiment examples and in conjunction with the accompanying figures. Here, in a schematic illustration in each case.

DETAILED DESCRIPTION

Figure 1:
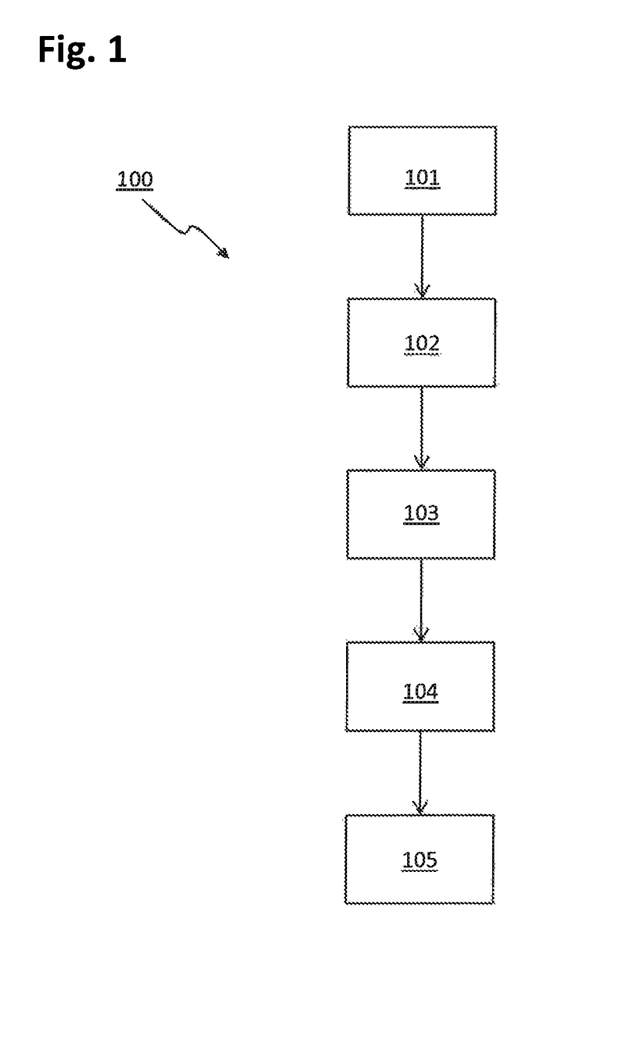
FIG. 1 shows a flow chart of a first embodiment of the method.

FIG. 1 shows a flow chart 100 of a method for processing a software project consisting of a primary code and a machine code on a first processing station by a first user. In a first method step 101, a first copy of the primary code is downloaded from a first memory to the first processing station. In a second method step 102, the first copy of the primary code is modified. In a third method step 103, a first program version of the machine code is generated from the first copy of the primary code. In a fourth method step 104, the first program version of the machine code is uploaded into a second memory. In a fifth method step 105, the modified copy of the primary code is automatically uploaded into the first memory, triggered by the upload of the first program version of the machine code into the second memory. The modified copy of the primary code uploaded in step 105 may be the modified first copy of the primary code. The processing station on which the method is carried out may be programmed in such a way that downloading of the first copy of the primary code in the first method step 101, generating a first program version of the machine code in the third method step 103 and uploading the first program version of the machine code into a second memory in the fourth method step 104 is triggered by user inputs of the first user and the modifying of the first copy of the primary code in the second method step 102 is carried out by the first user. The processing station provides the first user with the means of modifying the primary code, e.g. via an input mask and/or a programming interface. As soon as the fourth method step 104 triggered by the first user, i.e. the upload of the first program version of the machine code takes place, the modified copy of the primary code is also automatically uploaded into the first memory in the fifth method step 105, so that the first user does not have to take care of this method step himself, but this fifth method step 105 is automatically executed by the first processing station.

Figure 2:
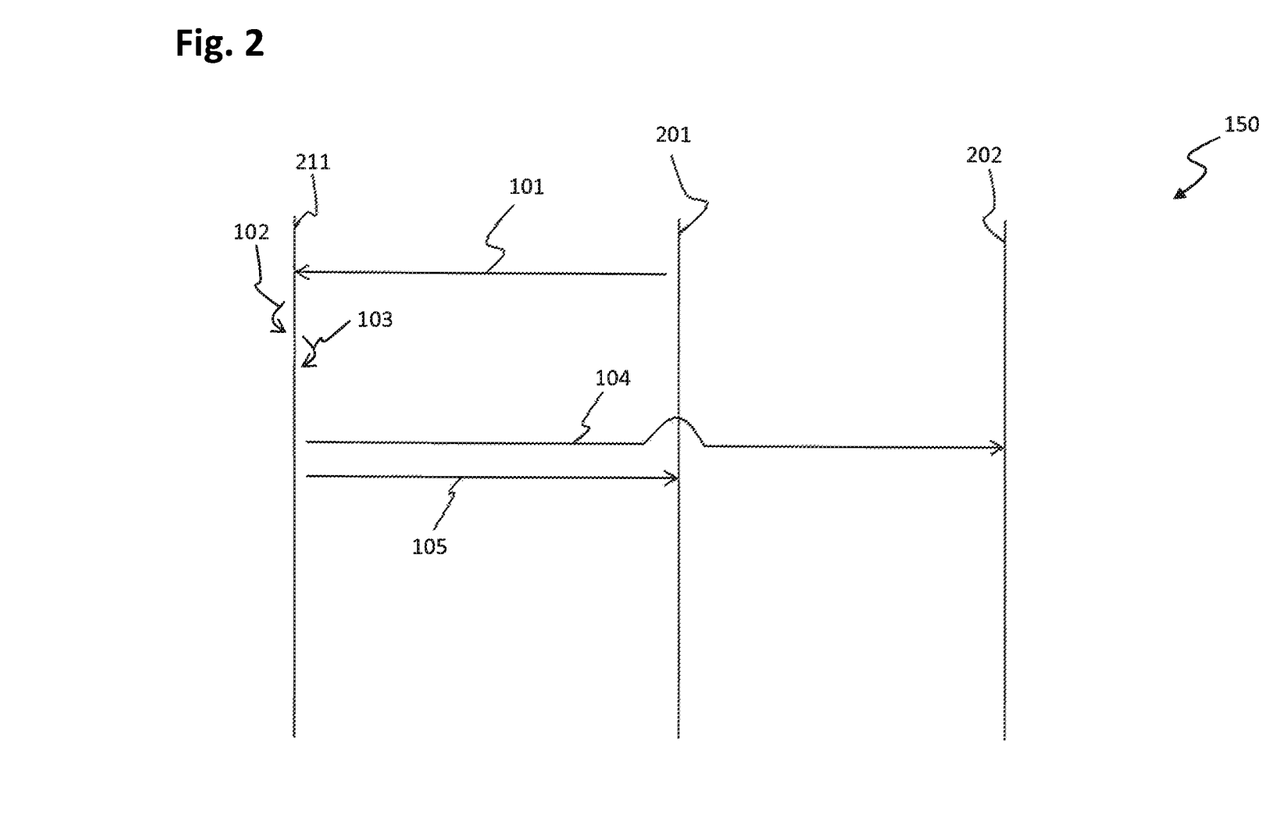
FIG. 2 shows a time schedule of the first embodiment of the method.

FIG. 2 shows a time schedule 150 of the method steps 101 to 105 of the method of FIG. 1 and the interactions of the first processing station 211 with the first memory 201 and the second memory 202. The time schedule of the method steps 101 to 105 is in this context carried out from top to bottom. In the first method step 101, a first copy of the primary code is downloaded from the first memory 201 to the first processing station 211. In the second method step 102, the first copy of the primary code is modified on the first processing station 211. In the third method step 103 a first program version of the machine code is generated from the first modified copy of the primary code. This first program version is then uploaded into the second memory 202 in the fourth method step 104. Triggered by the upload of the first program version of the machine code into the second memory 202 in the fourth method step 104, the modified copy of the primary code is automatically uploaded into the first memory 201 in the fifth method step 105.

The first memory 201 and the second memory 202 may be located at different physical locations, e.g. on different servers, as well as at the same physical location, e.g. on the same server or even on the same hard disk or the same flash memory. The machine code stored in the second memory 202 comprises the executable program version of the software project while the primary code version stored in the first memory 201 comprises the source files of the software project.

Figure 3:
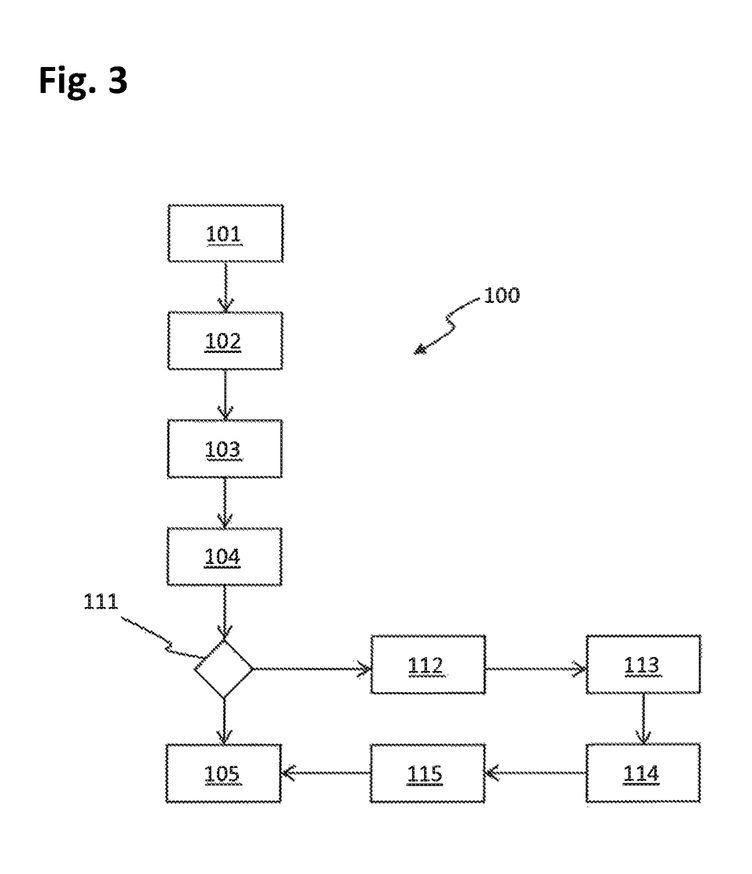
FIG. 3 shows a flow chart of a second embodiment of the method.

FIG. 3 shows a flow chart 100 of a second embodiment of the method. The first four method steps 101 to 104 correspond to the method steps of the embodiment example in FIG. 1. After the first program version of the machine code has been uploaded in the fourth method step 104, it is determined in a first checking step 111 whether, between downloading the first copy of the primary code in the first method step 101 and uploading the first program version of the machine code in the fourth method step 104, a second program version of the machine code generated from a second copy of the primary code has been uploaded into the second memory. If this was not the case, the fifth method step 105 of the embodiment example of FIG. 1, i.e. the automatic uploading of the modified copy of the primary code into the first memory, is carried out automatically. However, if the result of the first checking step 111 shows that a second program version of the machine code has been uploaded into the second memory, a modified second copy of the primary code is then downloaded from the first memory in a sixth method step 112. In a seventh method step 113, a request is issued to the first user to merge the first copy of the primary code and the second copy of the primary code into a third copy of the primary code. In an eighth method step 114, a third program version of the machine code is subsequently generated from the third copy of the primary code. This may be done by the first user following the request from the seventh method step 113. In a ninth method step 115, the third program version of the machine code is subsequently uploaded into the second memory. This is followed by the fifth method step 105, in which the automatic upload of the modified copy of the primary code into the first memory is configured as uploading the third copy of the primary code into the first memory.

In addition, it may be provided that before or after the first checking step 111, the modified first copy of the primary code is additionally uploaded into the first memory. It may also be provided that the upload of the first program version in the fourth method step 104 is aborted if the result of the first checking step 111 shows that a second program version of the machine code has been uploaded into the second memory.

Figure 4:
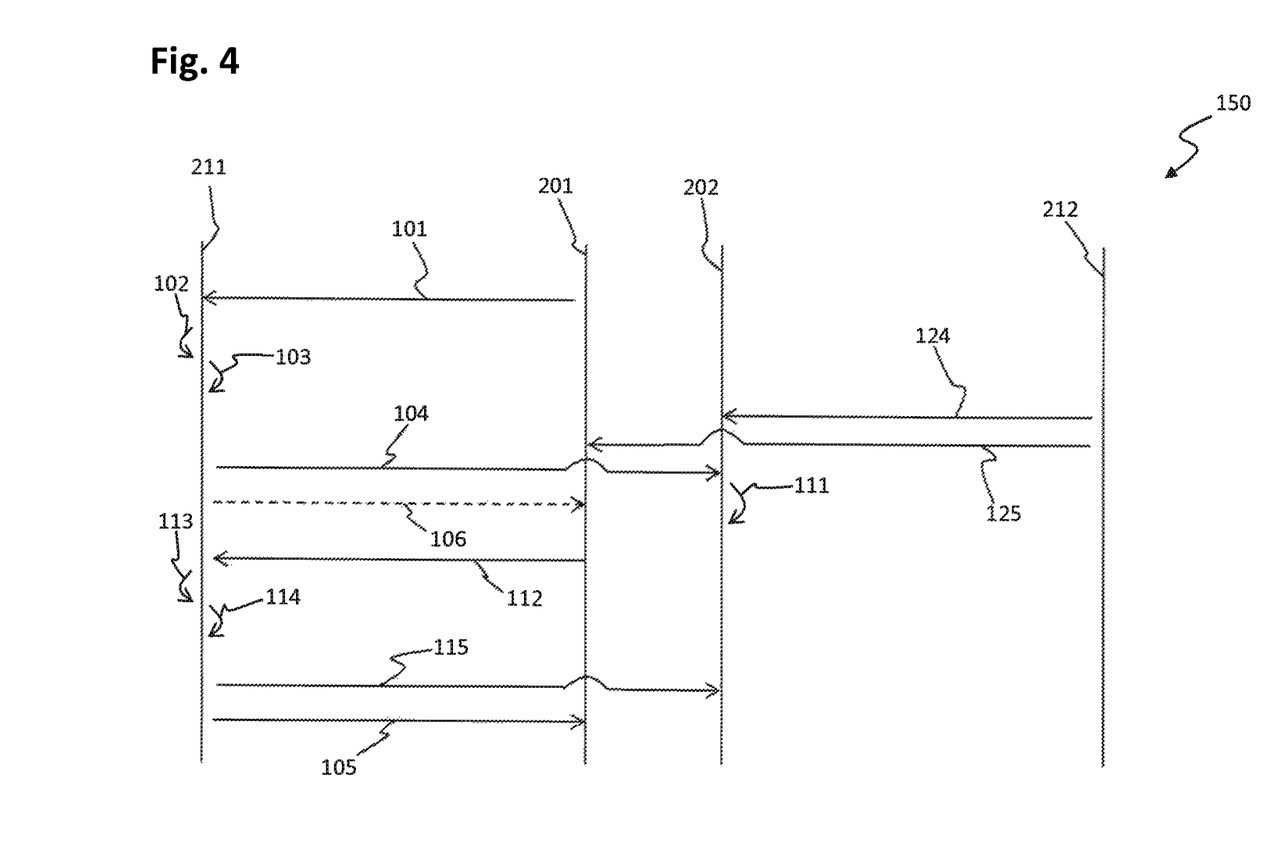
FIG. 4 shows a time schedule of the second embodiment of the method.

FIG. 4 shows the chronological sequence 150 of the method of FIG. 3. In this context, the first memory 201, the second memory 202 and the first processing station 211 correspond to the corresponding devices of FIG. 2. The method steps 101 to 104 are executed analogously to the chronological sequence of FIG. 2, the chronological sequence of the method steps is again from top to bottom. Between downloading the first copy of the primary code in the first method step 101 and uploading the first program version in the fourth method step 104, a second program version was uploaded from a second processing station 212 into the second memory 202 in a further fourth method step 124. In a further fifth method step 125, a second copy of the primary code was uploaded into the first memory 201. In the first checking step 111 it is now determined whether a second program version of the machine code was uploaded in the second memory 202. Since this is the case, the second copy of the primary code is now downloaded to the first processing station 211 in the sixth method step 112. Subsequently, in the seventh method step 113, a request is issued to the user to merge the first copy of the primary code modified in the second method step 102 and the second copy of the primary code downloaded in the sixth method step 112. Then, in the eighth method step 114, a third program version of the machine code is generated from the third copy of the primary code. Subsequent thereto, the third program version of the machine code is uploaded into the second memory 202 in the ninth method step 115. Automatically triggered by the ninth method step 115, the fifth method step 105 is carried out, in which the third copy of the primary code is uploaded into the first memory 201 as a modified copy of the primary code.

In addition, a further upload step 106 is shown as a dashed line in FIG. 4 in which the modified first copy of the primary code is uploaded into the first memory 201 independently of the first checking step 111. This method step is optional and may be used to provide all modified primary code versions in the first memory 201.

Figure 5:
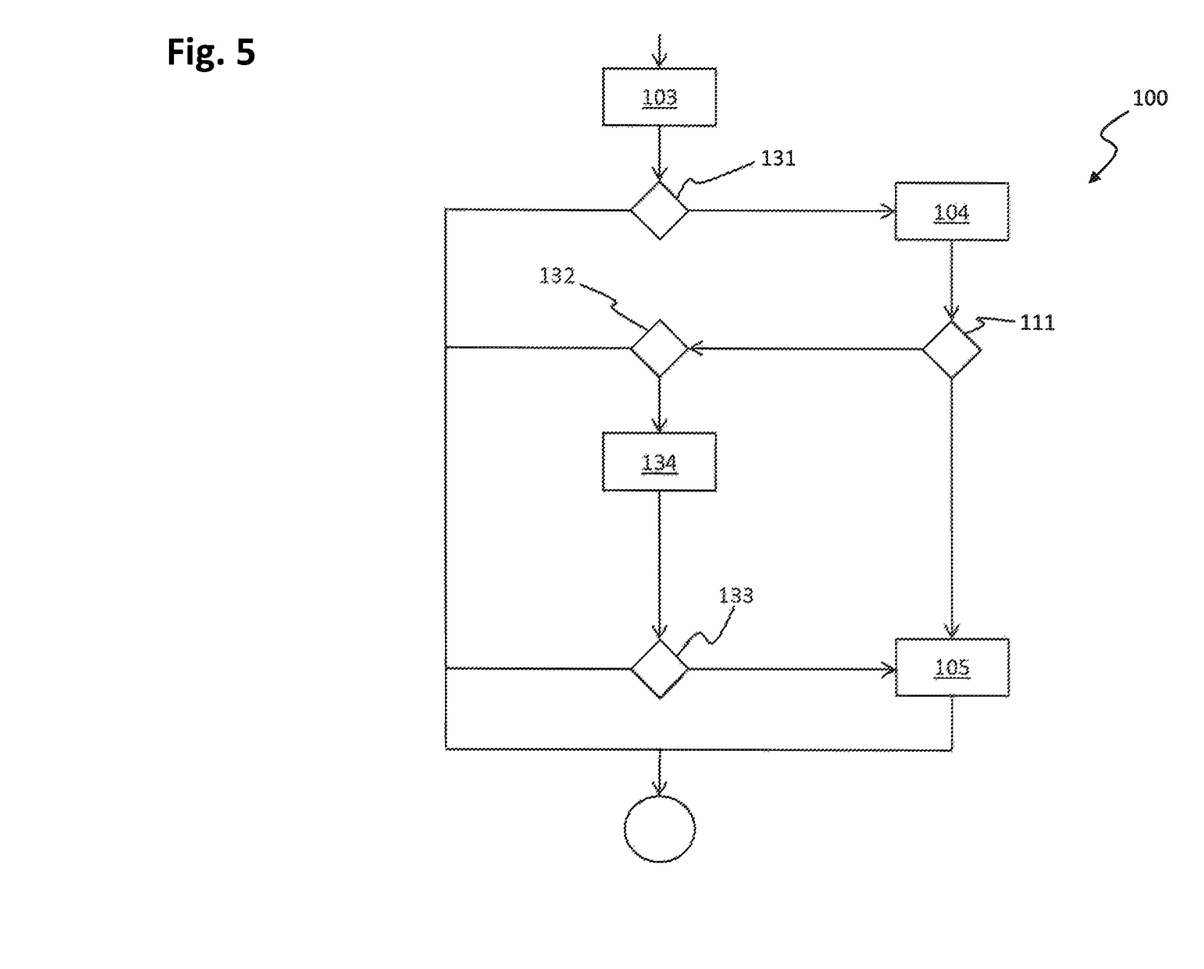
FIG. 5 shows a flow chart of an integration of the method into a method for updating stored primary code.

FIG. 5 shows a flow chart 100 which contains several of the method steps of the flow chart of FIG. 3 and in which further method steps are carried out. After the third method step 103, i.e. generating the first program version of the machine code from the first copy of the primary code, a second checking step 131 determines whether the generation was successful. If this is not the case, the process is aborted. The end of the procedure is indicated by a circle in the flow chart 100 of FIG. 5. If the generation was successful, the fourth method step 104, i.e. uploading the first program version of the machine code into the second memory, is subsequently carried out. Then, the first checking step 111 is carried out. If the first checking step 111 shows that no second program version of the machine code has been uploaded, the fifth method step 105 is carried out in the same way as described in FIG. 3. Instead of issuing the request to the first user and downloading the modified second copy of the primary code, in the flowchart 100 of FIG. 5, if it is determined in the verification step 111 that a second program version of the machine code has been uploaded into the second memory, a first decision step 132 is performed in which the first user may decide whether he wants to overwrite the second program version with the first program version. If this is not the case, the procedure is aborted. If this is the case, an overwriting step 134 follows, in which the first program version is uploaded into the second memory and the second program version is deleted from the second memory. Then a third checking step 133 determines whether the overwriting of the second program version was successful. If this is not the case, the procedure is aborted. If the overwriting of the second program version of the machine code was successful, the fifth method step 105, i.e. the upload of the modified first copy of the primary code into the first memory, is carried out automatically.

Figure 6:
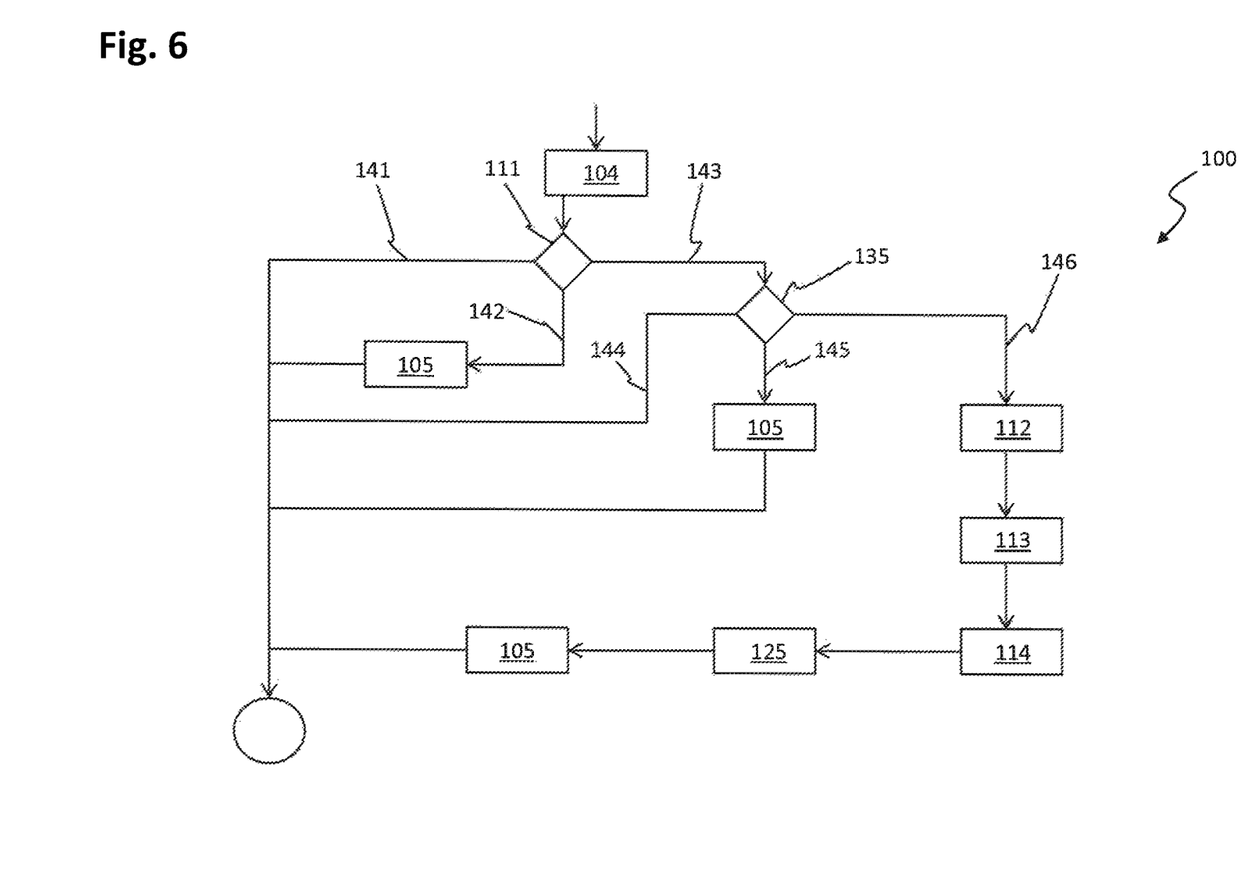
FIG. 6 shows a flow chart in which the method steps are also integrated into a method for updating a memory of a primary code.

FIG. 6 shows a further flow chart 100, which contains several of the method steps of the flow chart of FIG. 3 and in which further method steps are executed. After the fourth method step 104, the first checking step 111 is at first carried out. Here, a first path 141 may show that the first program version already corresponds to the program version stored in the second memory and consequently the process may be aborted. The end of the procedure is indicated by a circle in the flow chart 100 of FIG. 6. In addition, the first checking step 111 may result in a second path 142 which shows the case that no second program version was uploaded into the second memory and thus the upload of the first program version in the fourth method step 104 was successful. The fifth method step 105, i.e. uploading the modified copy of the primary code into the first memory, is subsequently carried out. If the first checking step 111 shows that a second program version has been uploaded into the second memory, the procedure moves on to a second decision step 135 via the third path 143. The first user is now faced with the choice of whether to discard the modifications carried out in a fourth path 144. Then the procedure is aborted and the first user's copy of the primary code is not uploaded into the first memory. Furthermore, a method step may be provided in the fourth path 144, in which the first program version from the fourth method step 104 is rejected, as well. Furthermore, the first user is given the option of discarding the second program version of the second user via the fifth path 145. Then the fifth method step 105 is carried out and the modified first copy of the primary code is uploaded into the first memory. Via the sixth path 146, the first user arrives at a third alternative, namely the merging of the two program versions as already described for FIG. 3 in method steps 112 to 115 and the subsequent method step 105.

In an embodiment example, checking whether the program versions of the machine code in the second memory are different is carried out via a time stamp of the program versions of the machine code. When the first copy of the primary code is downloaded, the time stamp of the upload of primary code and machine code is transmitted, as well. If, when uploading the machine code, the machine code already in the second memory also has this timestamp, the machine code has not been modified in the meantime; hence, the upload of the modified copy of the primary code may continue.

In an embodiment example, checking is carried out using a hash value of the program versions of the machine code. If, when uploading the generated program version of the machine code, the hash value of the program version of the machine code already in the second memory is equal to the hash value of the machine code when downloading the first copy of the primary code, no new program version of the machine code has been uploaded to the second memory in the meantime.

In an embodiment, the program versions, for example the first and/or the second and/or the third program version, are generated in the fourth method step 104 or in the eighth method step 114, respectively, by compiling the copies of the primary code.

Figure 7:
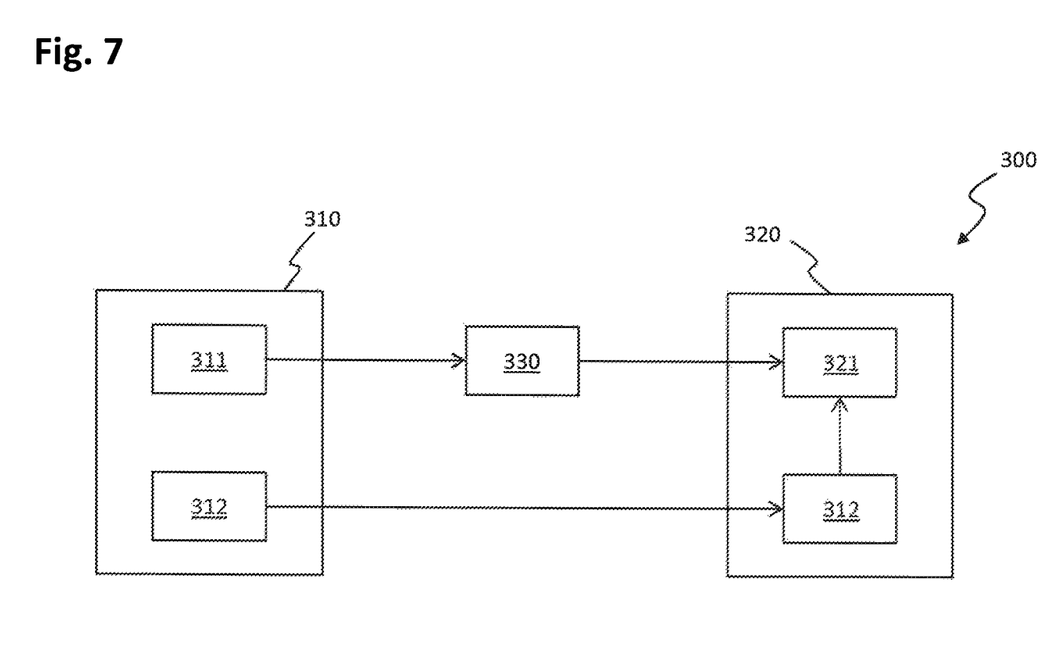
FIG. 7 shows a software project consisting of primary code and machine code, comprising a configuration file.

FIG. 7 shows a software project 300 consisting of a primary code 310 and a machine code 320. In this context, the primary code 310 comprises one or a plurality of source files 311 and a configuration file 312. If the machine code 320 is to be generated in the fourth method step or, respectively, in the eighth method step, the source files 311 are compiled into machine-readable files 321 by a compiler 330. The configuration file 312 does not run through the compiler 330 and is also available in machine code 320 in an unmodified manner. The configuration file 312 in machine code 320 is integrated into the machine-readable files 321, e.g. by providing a command in the machine-readable files 321 to load certain lines or values from the configuration file 312 and execute them. Configuration file 312 may contain information on peripheral devices and thus, for example, information on a driver selection for external devices.

Figure 8:
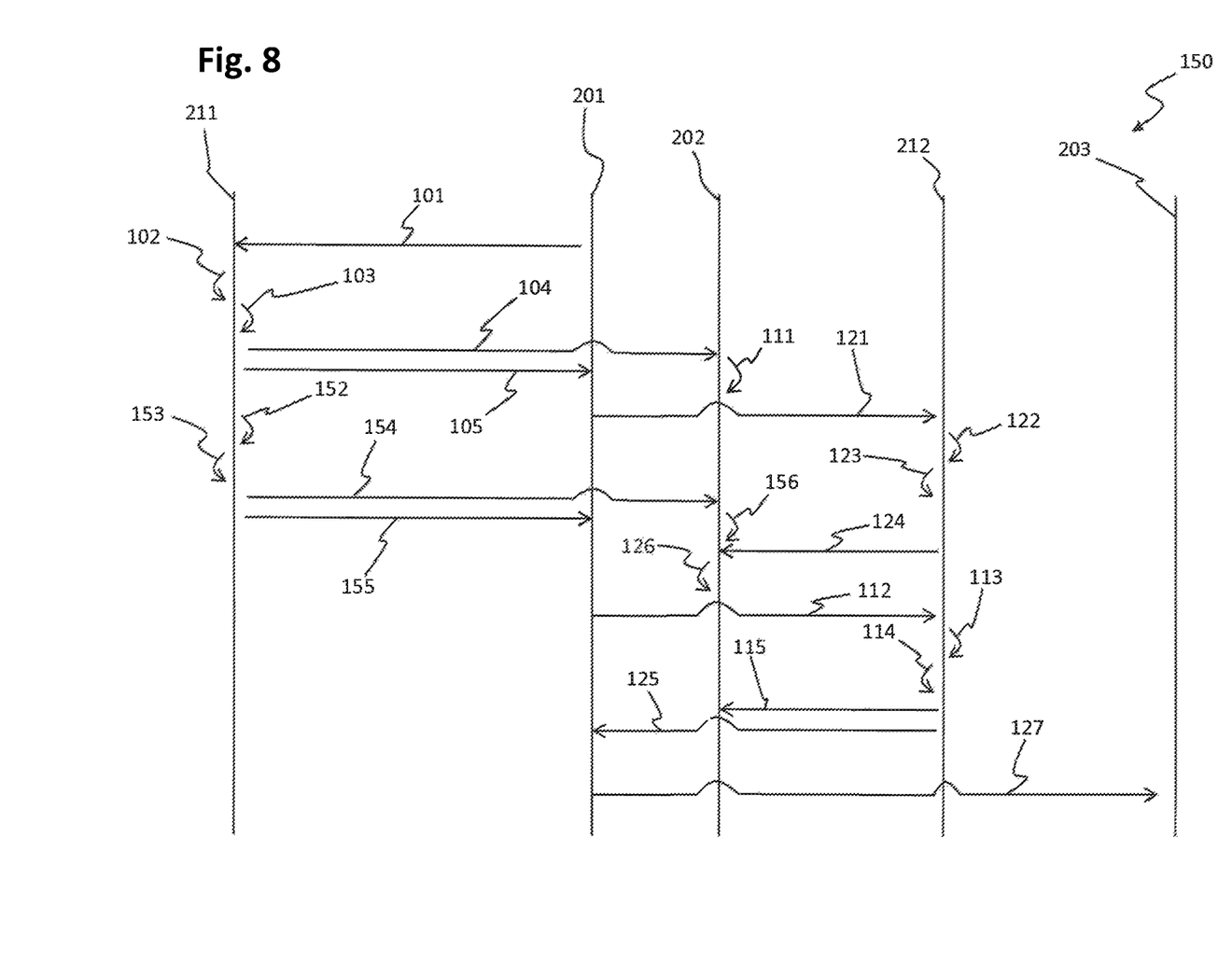
FIG. 8 shows a time schedule of a further embodiment of the method with an additional synchronization step.

FIG. 8 shows a further chronological sequence 150 of the method, in which method steps are taken from FIGS. 2 and 4 and which, unless differences are described below, correspond to the method steps of FIGS. 2 and 4. The method steps 101 to 105 are first carried out as described in FIG. 2. In a first checking step 111 after the fourth method step 104, it is determined that no further program version of the machine code has been uploaded in the meantime. For this reason, the fifth method step 105 is carried out. Then, in a further first method step 121, the copy of the primary code now located in the first memory 201 is downloaded to a second processing station 212. In a further second method step 122, a further third method step 123 and a further fourth method step 124, this copy of the primary code is modified by a second user on the second processing station 212 and the machine code generated from this is then uploaded into the second memory 202. At the same time, the first user has executed an additional second method step 152 and an additional third method step 153 on the first processing station 211 and has thus further changed the first program version of the machine code. The uploading of an additional first program version of the machine code by the first user, i.e. an additional fourth method step 154, takes place prior to the further fourth method step 124 of the second user. Furthermore, in an additional fifth method step 155, the further modified first copy of the primary code is uploaded into the first memory 201. The additional fifth method step 155 is thereby carried out automatically after it has been determined in an additional first checking step 156 after uploading the additional first program version of the machine code in the additional fourth method step 154 that no modified program version of the machine code has been uploaded in the meantime. After the program version of the machine code modified by the second user has been uploaded in a further fourth method step 124, it is now determined and established in a further first checking step 126 that between the downloading of the primary code in the further first method step 121 and the uploading of the program version of the machine code in the further fourth method step 124, the machine code has been modified by the additional fourth method step 154. Consequently, in a sixth method step 112, the modified primary-code version uploaded into the first memory 201 in the additional fifth method step 155 is downloaded to the second processing station 212 and subsequent thereto, method steps 113 to 115 are carried out as described for FIG. 4, but this time on the second processing station 212. In the ninth method step 115, the merged program version is now uploaded into the second memory 202 and at the same time a further fifth method step 125 is automatically executed by said uploading and the merged copy of the primary code is uploaded into the first memory 201. In a synchronizing step 127, the content of the first memory 201 is now synchronized with a third memory 203. This may e.g. be triggered if the second user at the second processing station 212 believes that a milestone in the software project has now been reached and a further data backup is therefore considered to be useful. However, the synchronizing step 127 may also be executed automatically, e.g. at the end of each working day or at night between two working days.

Figure 9:
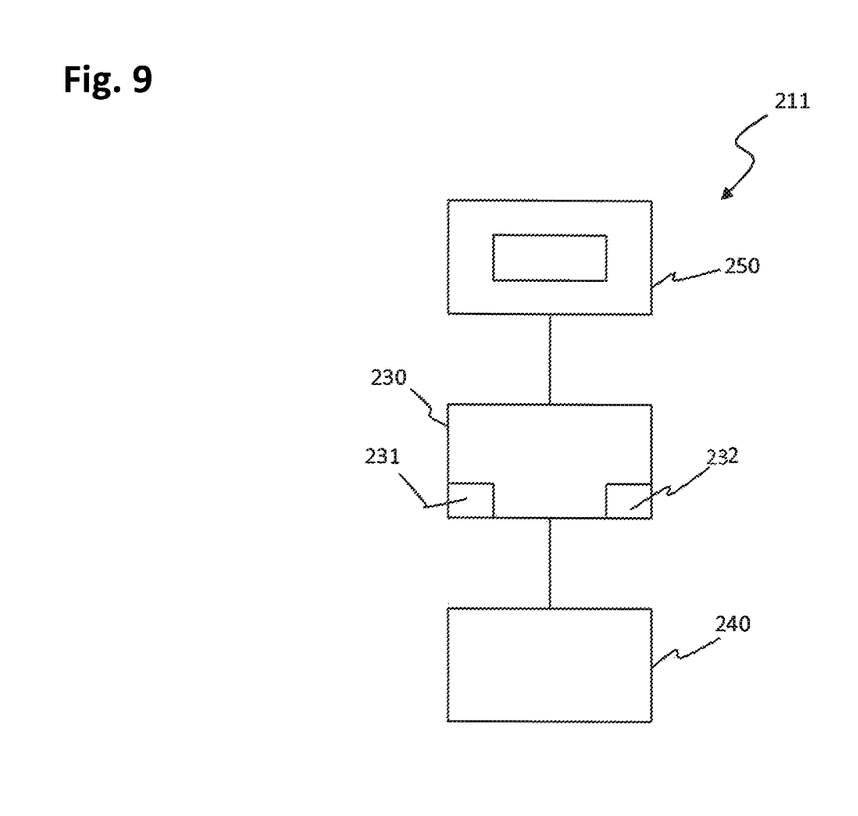
FIG. 9 shows a processing station.

FIG. 9 shows a first processing station 211 having a central computer 230, a first data interface 231, a second data interface 232 and an input facility 240 for a user.

Furthermore, the first processing station 211 has an optional display 250. As an alternative to this embodiment, the first processing station 211 may also consist of only the central processing unit 230 comprising a first data interface 231. Via the second data interface 232, remote access to the central processing unit 230 and thus to the first processing station 211 is then possible via a computer connected to the second data interface 232. This connection may be made over a network or the Internet, for example. At the first data interface 231, the first processing station 211 is connected to the first memory and the second memory. This, too, may be effected via a network interface or via the Internet. If, as shown in FIGS. 4 and 8, a plurality of processing stations are provided, these may be structured in the same way as the processing station in FIG. 9. However, the central processing unit 230 may also function as a server as described and the central processing unit 230 may be accessed from two different external computers via the second data interface 232. Such use of the central processing unit 230 constitutes the use of two processing stations in the sense of the present patent application.

Versions of the primary code stored in the first memory may be displayed via the display 250 or via a display of a computing unit connected to the second data interface 232, provided that it is intended to store several primary code versions in the first memory. A user who wants to modify the software project may then select from these versions shown on the display 250 which primary code version the user wants to modify. This may e.g. be used, for example, to discard changes that have proved to be non-functional and to start working on the software project with an older version.

The first memory and the second memory may be embodied as a central file server or as a so-called Git repository. Thereby, the first and second memory may be physically located on the same storage medium, e.g. on a hard disk of a server.

The described processing station and the described method of changing and revising a software project may be used to particular advantage in automation technology.

Figure 10:
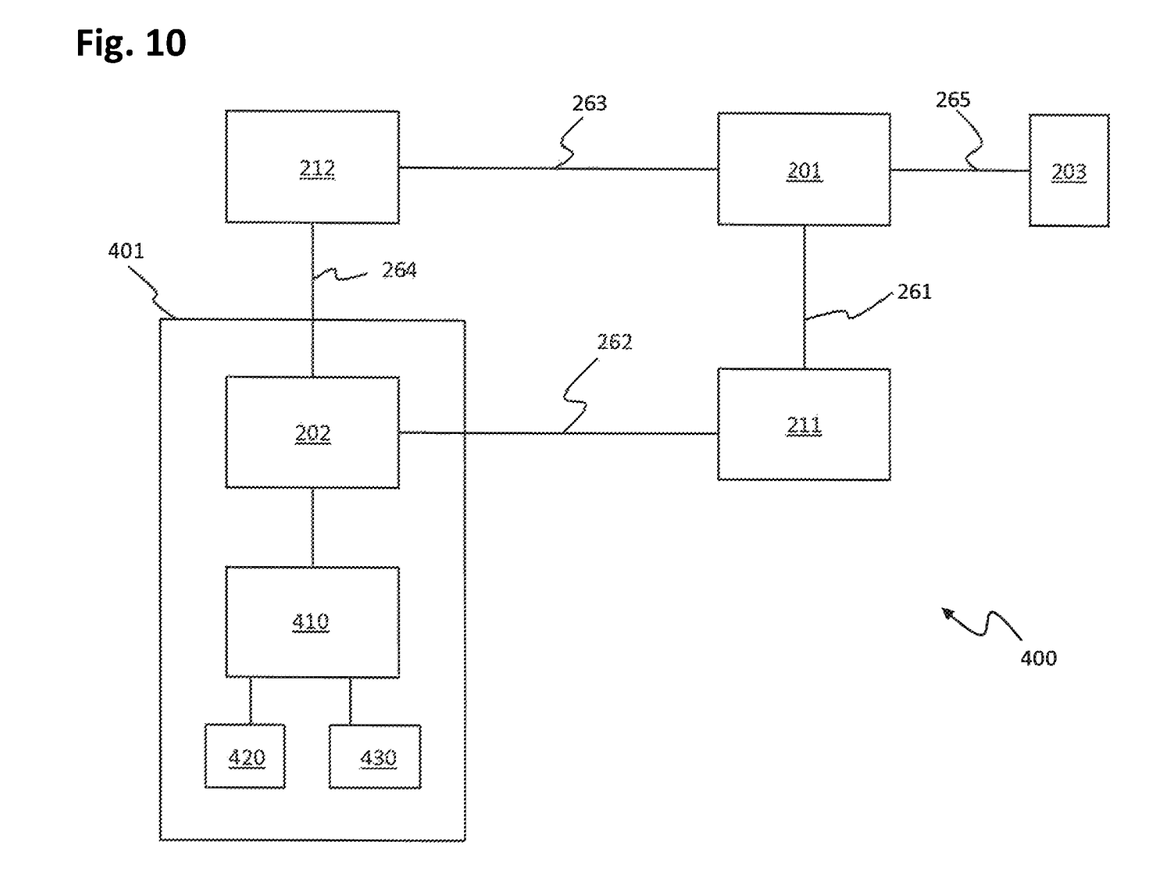
FIG. 10 shows an automation system with an automation component and a processing station.

FIG. 10 shows an automation system 400 with an automation component 401 and a first processing station 211, as well as a first memory 201. A second memory 202 is assigned to the automation component 401. In this context, the memories 201, 202 and the first processing station 211 function as described above. The automation component 401 has a control computer 410 as well as sensor inputs 420 and actuator outputs 430. A control program running on the control computer 410 may read in sensor data detected via at least one of the sensor inputs 420 and use this sensor data to control actuators via at least one of the actuator outputs 430. Such an automation component 401 may be part of a larger facility control system, e.g. within the framework of building automation or in the field of industrial control of a production plant. The second memory 202 is assigned to the control computer 410 and connected to it. In the second memory 202 a control software, which contains for example the control program running on the control computer, of the control computer 410 is stored. This control software is a software project of the procedure described so far. Particularly in automation technology it is important to implement changes to the control software in such a way that the automation component 401 has the shortest possible service life. Thus, the described procedure of checking whether, while a first user has edited the control software, a second user has uploaded another program version of the machine code of the control software into the second memory 202, is of particular importance. The automation system 400 of FIG. 10 additionally has a second processing station 212. The first processing station 211 is connected to the first memory 201 via a first communication link 261 and to the second memory 202 via a second communication link 262, so that on the one hand the primary code of the software project may be downloaded from the first memory 201 and on the other hand the machine code of the software project may be uploaded into the second memory 202. The first processing station 211 may, in analogy to FIG. 9, have a central processing unit comprising a first data interface, wherein the communication link may be connected to the first data interface 231 of the central processing unit. Via a third communication link 263 the second processing station 212 is connected to the first memory 201. Via a fourth communication link 264, the second processing station 212 is connected to the second memory 202. The first memory 201 is connected to a third memory 203 via an optional fifth communication link 265. This may be used to carry out the synchronization step described in FIG. 8. If an additional storage in the third memory 203 is not required, the third memory 203 and the fifth communication link 265 may be dispensed with. If the second processing station 212 is dispensed with, the third and fourth communication links 263, 264 may be omitted, as well. In such an automation system 400, the described procedure may be carried out and thus the downtimes of the automation component 401 may be reduced and at the same time it may be achieved that several processing stations 211, 212 may work on the control software or, respectively, on the software project for the control computer 410.

Figure 11:
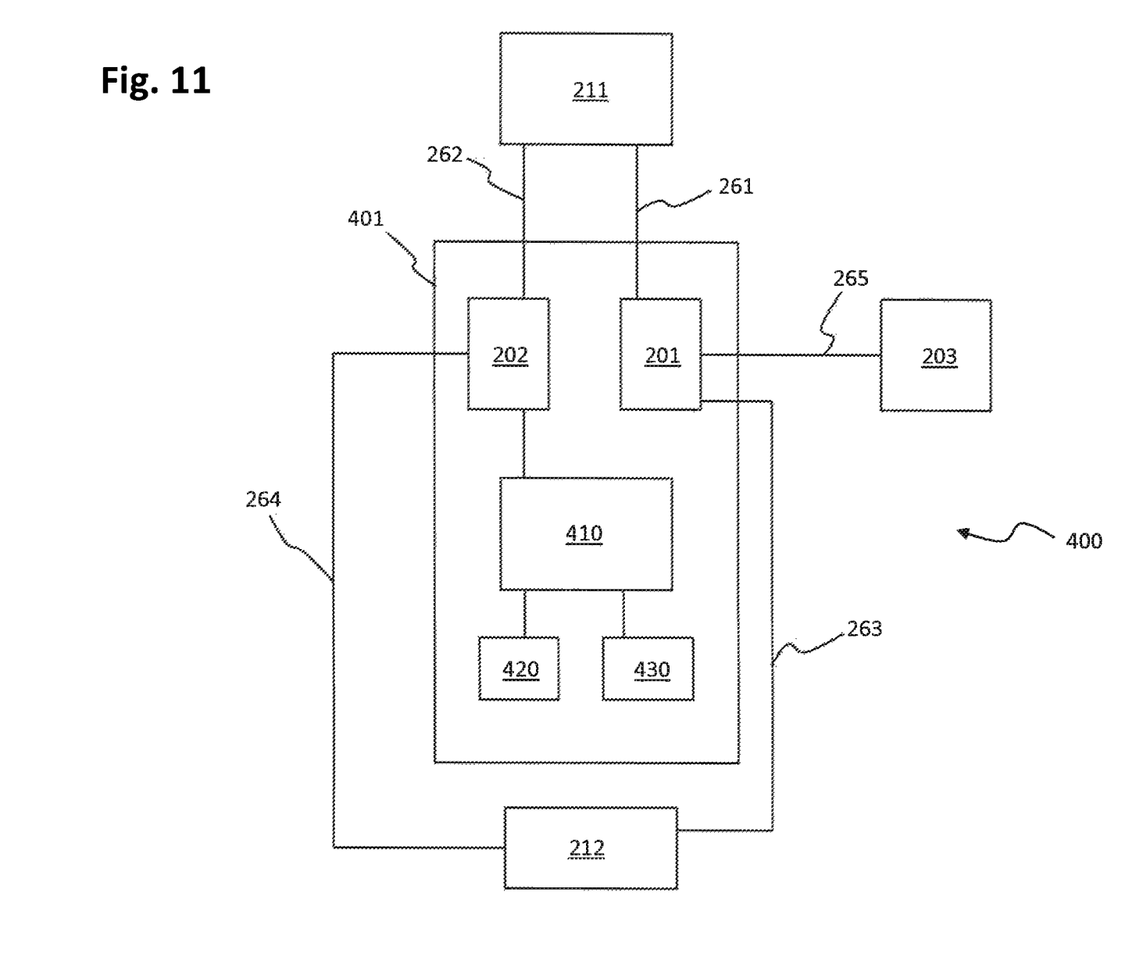
FIG. 11 shows another embodiment example of such an automation system.

FIG. 11 shows a further embodiment example of an automation system 400 which corresponds to the automation system of FIG. 10, provided that no differences are described in the following. In this embodiment of the automation system 400, the first memory 201 is also assigned to the automation component 401. The first memory 201 and the second memory 202 may be stored on an identical hard disk or on different hard disks or on identical or different storage options in the first automation component 401.

The first memory 201, the second memory 202 and the third memory 203 may be embodied as git repositories or as another option for decentralized version management.

The invention claimed is:

1. A method for processing a software project comprising a primary code and of a machine code on a first processing station by a first user, comprising the following method steps carried out in order:
   downloading a first copy of the primary code from a first memory to the first processing station;
   modifying the first copy of the primary code;
   generating a first program version of the machine code, wherein the first program version of the machine code is generated from the first copy of the primary code;
   uploading the first program version of the machine code to a second memory; and
further comprising the following method steps:
   checking whether, between the downloading of the first copy of the primary code and the uploading of the first program version of the machine code into the second memory, a second program version of the machine code generated from a second copy of the primary code has been uploaded into the second memory;
   downloading a modified second copy of the primary code from the first memory if it is determined during checking that a second program version of the machine code has been uploaded into the second memory;

issuing a request to the first user to merge the first copy of the primary code and the second copy of the primary code into a third copy of the primary code; and further comprising one of the two following method steps:
generating a third program version of the machine code from the third copy of the primary code, uploading the third program version of the machine code to the second memory, and automatically uploading the third copy of the primary code into the first memory, triggered by the upload of the third program version of the machine code into the second memory; or overwriting the second program version of the machine code with the first program version of the machine code, triggered by a response of the first user to the issued request, and automatically uploading the first copy of the primary code into the first memory, triggered by the upload of the first program version of the machine code into the second memory.

2. The method according to claim 1, wherein the uploading of the first program version of the machine code is aborted before the request is issued to the first user.

3. The method according to claim 1, comprising the step of generating a third program version of the machine code, wherein additionally the modified first copy of the primary code is uploaded into the first memory.

4. The method according to claim 1, wherein checking is carried out on the basis of a time stamp of the program versions of the machine code.

5. The method according to claim 1, wherein checking is carried out using a hash value of the program versions of the machine code.

6. The method according to claim 1, wherein generating the program versions of the machine code is carried out by compiling the copies of the primary code.

7. The method according to claim 1, wherein the software project comprises a configuration file, wherein the configuration file is part of the primary code, wherein the configuration file is integrated into the program versions of the machine code, wherein modifying the first copy of the primary code comprises modifying the configuration file, wherein the modified configuration file is uploaded into the second memory.

8. The method according to claim 1, wherein a plurality of primary-code versions are stored in the first memory, and wherein a display of the primary-code versions stored in the first memory is retrieved at the first processing station.

9. The method according to claim 1, wherein one or a plurality of primary-code versions from the first memory are synchronized with a third memory according to a standard, in particular a user entry or in an automated manner.

10. The method according to claim 1, wherein the software project is an automation project, wherein the machine code serves to control an automation component, and wherein the second memory is arranged in the automation component.

11. The method according to claim 10, wherein the first memory is located in the automation component.

12. A processing station comprising a first data interface, a central computer and an input facility for a user, configured to perform the method according to claim 1.

13. An automation system comprising at least one processing station according to claim 12, the first memory and an automation component having the second memory, wherein a first communication link is installed between the first memory and the processing station and a second communication link is installed between the processing station and the second memory.

14. A method for processing a software project comprising a primary code and of a machine code on a first processing station by a first user, comprising the following method steps carried out in order:
downloading a first copy of the primary code from a first memory to the first processing station;
modifying the first copy of the primary code;
generating a first program version of the machine code, wherein the first program version of the machine code is generated from the first copy of the primary code;
uploading the first program version of the machine code to a second memory assigned to an automation component; and further comprising the following method steps:
checking whether, between the downloading of the first copy of the primary code and the uploading of the first program version of the machine code into the second memory, a second program version of the machine code generated from a second copy of the primary code has been uploaded into the second memory;
downloading a modified second copy of the primary code from the first memory if it is determined during checking that a second program version of the machine code has been uploaded into the second memory;
issuing a request to the first user to merge the first copy of the primary code and the second copy of the primary code into a third copy of the primary code; and further comprising one of the two following method steps:
generating a third program version of the machine code from the third copy of the primary code, uploading the third program version of the machine code to the second memory, and automatically uploading the third copy of the primary code into the first memory, triggered by the upload of the third program version of the machine code into the second memory; or overwriting the second program version of the machine code with the first program version of the machine code, triggered by a response of the first user to the issued request, and automatically uploading the first copy of the primary code into the first memory, triggered by the upload of the first program version of the machine code into the second memory.

15. The method according to claim 14, wherein the uploading of the first program version of the machine code is aborted before the request is issued to the first user.

16. The method according to claim 14, comprising the step of generating a third program version of the machine code, wherein additionally the modified first copy of the primary code is uploaded into the first memory.

17. The method according to claim 14, wherein checking is carried out on the basis of a time stamp of the program versions of the machine code.

18. The method according to claim 14, wherein checking is carried out using a hash value of the program versions of the machine code.

19. A processing station comprising a first data interface, a central computer and an input facility for a user, configured to perform the method according to claim 14.

20. An automation system comprising at least one processing station according to claim 19, the first memory and the second memory assigned to the automation component, wherein a first communication link is installed between the first memory and the processing station and a second communication link is installed between the processing station and the second memory.

* * * * *